United States Patent [19]
Eto

[11] Patent Number: 4,511,673
[45] Date of Patent: Apr. 16, 1985

[54] CATALYST FOR REFORMING OF METHANOL AND PROCESS OF PREPARING SAME

[75] Inventor: Yoshiyuki Eto, Yokosuka, Japan

[73] Assignee: Nissan Motor Co., Ltd., Yokohama, Japan

[21] Appl. No.: 478,350

[22] Filed: Mar. 24, 1983

[30] Foreign Application Priority Data

Apr. 2, 1982 [JP] Japan ................................. 57-53712

[51] Int. Cl.³ .......................... B01J 23/10; B01J 23/40
[52] U.S. Cl. ..................................... 502/525; 502/302; 502/303; 502/304; 502/332; 502/333; 502/334
[58] Field of Search ............... 502/525, 302, 303, 304, 502/332, 334, 333

[56] References Cited

U.S. PATENT DOCUMENTS

| | | | |
|---|---|---|---|
| 4,151,123 | 4/1979 | McCann | 502/525 |
| 4,170,573 | 10/1979 | Ernest et al. | 502/303 |
| 4,413,152 | 11/1983 | Arena | 502/332 |

*Primary Examiner*—Delbert E. Gantz
*Assistant Examiner*—Chung K. Pak
*Attorney, Agent, or Firm*—Schwartz, Jeffery, Schwaab, Mack, Blumenthal & Koch

[57] ABSTRACT

A catalyst for reforming $CH_3OH$ to $H_2$ and CO, which is high in activity, selectivity and durability. The catalyst uses a granular or monolithic carrier which is made of active alumina at least in its surface regions, and compound oxide(s) of perovskite structure $MAlO_3$, where M is a metal selected from the rare earth elements, e.g. La or Ce, or from the titanium family elements, e.g. Ti or Zr, and catalytic metal(s) of the platinum group, e.g. Pt, Pd and/or Rh, are deposited on the carrier. Preferably the amount of the metal(s) M in the compound oxide(s) is 0.1–10.0 Wt % of the carrier, and the content of the metal(s) of the platinum group in the catalyst is 0.1 to 1.0 Wt %. The catalyst is prepared by first depositing the compound oxide(s) on the carrier by pyrolysis of suitable salts of the respective metals M and Al which are applied to the carrier as a mixed solution, and then depositing the catalytic metal(s) by pyrolysis of suitable compound(s) of the catalytic metal(s) applied to the carrier as a solution.

28 Claims, No Drawings

CATALYST FOR REFORMING OF METHANOL AND PROCESS OF PREPARING SAME

BACKGROUND OF THE INVENTION

This invention relates to an improved catalyst for reforming of methanol to hydrogen and carbon monoxide and a process of preparing the same. The catalyst is of the class using a metal of the platinum group as the primary catalytic component.

For use in reforming of methanol to hydrogen and carbon monoxide various catalysts have heretofore been proposed. In one group of such catalysts, a noble metal or a base metal is used as a principal catalytic material which is deposited on a support or carrier made of either active alumina or a silica base oxide. Generally in the catalysts of this category noble metals have been accepted as superior to base metals in terms of both catalytic activity and durability, and some metals of the platinum group such as platinum, palladium and rhodium have been taken as especially advantageous. From a practical point of view, however, these catalysts are still unsatisfactory in their activity, durability and selectivity for the intended decomposition reaction that gives hydrogen and carbon monoxide even when the platinum group metals are used.

In another group of catalysts for reforming of methanol, an oxide of either a rare earth element or a titanium family element is deposited on a carrier which is mainly active alumina precedent to the deposition of a noble metal on the carrier. Lanthanum oxide and cerium oxide are typical examples of the mentioned oxide, and platinum, palladium and/or rhodium are preferred as the catalytic metal also in the catalysts of this group. These catalysts are relatively high in their activity in fresh state and also in the selectivity for the intended decomposition reaction, but they are not yet satisfactory in the activity at relatively low temperatures, durability in the methanol reforming apparatus and adaptability to the reforming processes in which vaporized methanol is passed through a catalyst column at a relatively high space velocity.

In the production of the above described conventional catalysts for the reforming of methanol, it is a common trend to increase the content of the noble metal in order to compensate for the aforementioned shortcomings as far as possible. However, this compensative measure is of limited effect and inevitably leads to a considerable rise in the cost of the catalysts, which imposes a great burden on the reforming of methanol as an industrial process.

SUMMARY OF THE INVENTION

It is an object of the present invention to provide an improved catalyst for reforming of methanol to hydrogen and carbon monoxide, which catalyst contains a relatively small amount of noble metal but is sufficiently high in its activity and selectivity for the intended reforming reaction even at relatively low temperatures and is high also in durability even when used under relatively severe reaction conditions.

It is another object of the present invention to provide a process of preparing a catalyst according to the invention.

A catalyst according to the invention comprises a support or carrier which may be either granular or monolithic and in any case is made of active alumina at least in substantially the entire surface region thereof, at least one compound oxide which is expressed by the general formula $MAlO_3$ where M represents a metal element selected from the rare earth elements or from the titanium family elements and at least one catalytic metal of the platinum group, both the compound oxide(s) and the catalytic metal(s) being deposited and distributed on the carrier.

Preferably the total amount of the metal M in the compound oxide(s) $MAlO_3$ is in the range from 0.1 to 10.0% by weight of the carrier, and also preferably the total content of the metal(s) of the platinum group in the catalyst is in the range from 0.1 to 1.0% by weight.

Preferred examples of the metal M in the compound oxide $MAlO_3$ are La, Ce, Ti and Zr, and preferred examples of the aforementioned catalytic metal are Pt, Pd and Rh.

My process of preparing a catalyst according to the invention comprises the following steps, assuming for simplicity that only one compound oxide $MAlO_3$ and only one metal of the platinum group are present in the catalyst. (A) First the carrier is impregnated with an aqueous mixed solution of an inorganic salt of aluminum and an inorganic salt of the metal selected from the rare earth elements or from the titanium family elements. (B) The carrier impregnated with the solution is adequately dried and then baked so as to decompose the salts of aluminum and the selected metal adhering to the carrier to thereby form an intended compound oxide $MAlO_3$ on the carrier. (C) The carrier after the baking step (B) is impregnated with an aqueous solution of a thermally decomposable inorganic compound of a selected catalytic metal of the platinum group. (D) After adequate drying the carrier impregnated with the solution is baked so as to decompose the catalytic metal compound adhering to the carrier to thereby deposit the catalytic metal of the platinum group on the carrier on which the compound oxide $MAlO_3$ has already been deposited.

To prepare a catalyst containing two kinds of compound oxides $MAlO_3$, an inorganic salt of another selected metal M is dissolved in the solution at step (A) together with the aforementioned two salts. To prepare a catalyst containing two kinds of metals of the platinum group, the solution at step (C) is prepared as a mixed solution of thermally decomposable inorganic compounds of the respective metals of the platinum group.

A catalyst according to the invention is sufficiently high in its activity even at relatively low temperatures and, as particular advantages over the conventional catalysts, exhibits remarkably high selectivity for the intended decomposition reaction of methanol to hydrogen and carbon monoxide and is high also in durability. Such advantages of this catalyst are attributed to the coexistence of at least one compound oxide $MAlO_3$, which is of the perovskite structure, with the catalytic metal(s) of the platinum group.

In the reforming of methanol, methanol is expected to undergo decomposition according to the following equation (1).

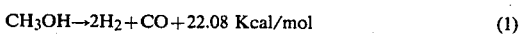
$$CH_3OH \rightarrow 2H_2 + CO + 22.08 \text{ Kcal/mol} \tag{1}$$

However, there is a possibility of side reactions represented by the following equations (2), (3) and/or (4) accompanying the main reaction (1).

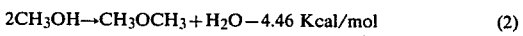
$$2CH_3OH \rightarrow CH_3OCH_3 + H_2O - 4.46 \text{ Kcal/mol} \tag{2}$$

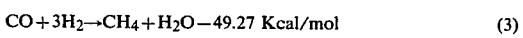
$$CO + 3H_2 \rightarrow CH_4 + H_2O - 49.27 \text{ Kcal/mol} \tag{3}$$

$$CH_3OH + H_2 \rightarrow CH_4 + H_2O - 27.19 \text{ Kcal/mol} \quad (4)$$

In the catalyst of the invention the compound oxide $MAlO_3$ of the perovskite structure, which occludes oxygen, has the effects of promoting the main decomposition reaction of the equation (1) and suppressing the unfavorable side reactions of the equations (2)–(4). Consequently the product of the reforming process using the catalyst of the invention becomes high in the contents of hydrogen and carbon monoxide and very low in the contents of hydrocarbons such as methane and dimethyl ether. Besides, the compound oxide $MAlO_3$ in this catalyst serves the function of enhancing the thermal stability of the active alumina, i.e. gamma-alumina, employed as the principal material of the catalyst carrier and therefore contributes to the improvement on the durability of the catalyst.

The activity of a catalyst of the invention can further be enhanced by subjecting the catalyst prepared through the above described steps (A)–(D) to a supplementary treatment with a solution of a suitable reducing agent, e.g. sodium boron hydride.

DESCRIPTION OF THE PREFERRED EMBODIMENTS

In the present invention it is usual to use a catalyst carrier in the form of granules or pellets, but it is also possible to use a monolithic carrier having a porous or honeycomb structure. The carrier can be selected from conventional ones, but it is a requirement that the carrier be made of active alumina, which is typified by gamma alumina, either in its entirety or at least in its surface regions where the catalytic substances are to be deposited. That is, the core portion of the carrier is not necessarily made of active alumina but may be made of a different inorganic oxide. However, it is preferred to use a granular catalyst carrier which consists essentially of active alumina.

As regards the compound oxide of perovskite structure $MAlO_3$ the presence of which is characteristic of a catalyst of the invention, preferred examples of the metal M are La and Ce among the rare earth elements and Ti and Zr among the titanium family elements. If desired the catalyst may contain two or more kinds of such compound oxides $MAlO_3$.

As to the total amount of the compound oxide(s) $MAlO_3$ in this catalyst, it is preferable that the total content of the metal(s) M in the catalyst is in the range from 0.1 to 10.0% by weight of the catalyst carrier. When the total content of the metal(s) M is less than 0.1% by weight the expected effect of the compound oxide(s) $MAlO_3$ is hardly appreciable in practice, but when the content of the metal(s) M exceeds 10% by weight the catalyst suffers lowering in its performance and particularly in its activity at relatively low temperatures.

In preparing a catalyst of the invention, it is suitable to first deposit the compound oxide(s) $MAlO_3$ on the effective surfaces of the catalyst carrier and subsequently deposit the selected metal(s) of the platinum group.

A desired compound oxide of perovskite structure $MAlO_3$ can be formed on the carrier surface by thermal decomposition of a mixture of a compound of the metal M and an aluminum compound. In a practical process, first the carrier is immersed in an aqueous mixed solution of an oxygen-containing salt such as nitrate or sulfate of the selected metal M and an oxygen-containing salt such as nitrate of aluminum so as to be well impregnated with the solution. Where it is intended to prepare a catalyst containing two kinds of metals M both in the form of compound oxide or aluminate $MAlO_3$, the aqueous solution is prepared by dissolving an oxygen-containing salt of the additionally desired metal M together with the aforementioned two kinds of salts.

The carrier impregnated with the mixed solution is dried to reduce the moisture content to a suitable level and then baked in a hydrogen gas atmosphere at a temperature in the range from about 800° C. to about 950° C. for about 1 hr to about 3 hr. When the baking temperature is below 800° C., the decomposition of the metal salts and/or conversion of the decomposed materials to the intended aluminate $MAlO_3$ may possibly remain incomplete. However, when the baking temperature is above 950° C. there arises a possibility of transformation of the $\gamma$-alumina of the carrier to $\alpha$-alumina to result in lowering in the activity of the catalyst. The baking is carried out for at least about 1 hr in order to complete the decomposition of the metal salts and conversion of the decomposed materials to the intended compound oxide. However, it is undesirable to continue the baking for more than about 3 hr because of the possibility of transformation of the $\gamma$-alumina of the carrier to $\alpha$-alumina which becomes serious when the baking temperature is relatively high.

After the deposition of the aluminate $MAlO_3$, at least one of the platinum group metals that are known as high in catalytic activity is deposited on the carrier by thermal decomposition of a suitable compound of the selected metal. It is preferred to make a selection from platinum, palladium and rhodium. Also it is preferred that the total content of the platinum group metal(s) in the catalyst falls in the range from 0.1 to 1.0% by weight.

For the deposition of a platinum group metal, the carrier already comprising the compound oxide $MAlO_3$ is first immersed in an acidic aqueous solution of a thermally decomposable compound of the selected metal so as to be well impregnated with the solution. In the case of preparing a catalyst that contains two or more kinds of platinum group metals, use is made of an acidic mixed aqueous solution prepared by dissolving thermally decomposable compounds of the respective metals. Typical examples of platinum group metal compounds useful in the process according to the invention are chloroplatinic acid, palladium chloride and rhodium chloride. It is optional to add ammonium thiosulfate to the platinum group metal compound solution to thereby impregnate the carrier with a sulfurized complex compound.

The carrier impregnated with the platinum group metal compound solution is dried to reduce the moisture content to a suitable level and then baked at a temperature in the range from about 500° C. to about 600° C. for about 1 hr to about 3 hr. It is preferred to carry out the baking in a steam atmosphere, though it is also possible to perform the baking either in air or in hydrogen gas. When the baking temperature is below 500° C. the decomposition of the platinum group metal compound to the metal may possibly remain incomplete. However, when the baking temperature is above 600° C. there is a tendency to sintering of the platinum group metal formed by the thermal decomposition as a cause of lowering in the performance of the obtained catalyst.

The preparation of a catalyst according to the invention is accomplished by the above described process, but it is optional and rather preferable to subject this catalyst to a treatment in a reducing solution because such a treatment has the effect of considerably enhancing the activity of the catalyst. For this treatment a free selection can be made from various reducing agents such as hydrazine, formaldehyde, pyrogallol, hydroquinone, formic acid, oxalic acid, sodium boron hydride, sodium sulfide and ammonium sulfide, but the use of sodium boron hydride gives the best result. The liquid phase reduction treatment is accomplished simply by immersing the catalyst obtained by the above described two-stage baking process in a solution of a selected reducing agent and keeping the catalyst in the solution for about 1–5 min with adequate stirring. Preferably the concentration of the reducing agent in the solution is at least 0.05% by weight with a view to providing a sufficient reducing power but does not exceed 2% by weight, because at higher concentrations the reducing reaction proceeds too rapidly with significant increase in the concentration of hydrogen formed by the reaction as an inconvenience to smooth accomplishment of the treatment. When the duration of this treatment is shorter than 1 min the reducing reaction may be incomplete, but it is unnecessary to continue the treatment for more than 5 min because the reducing reaction reaches completion within 5 min. After the treatment with the reducing solution, the catalyst is washed with water and dried.

In a catalyst obtained through the reduction treatment, the metal, or metals, of the platinum group exists in the form of very pure and fine particles. In the case of platinum for example, deposition of so-called platinum black in very fine particulate form is realized. Therefore, this catalyst exhibits a remarkably improved activity.

The invention will further be illustrated by the following nonlimitative examples.

EXAMPLE 1

In this example, and also in the succeeding examples, use was made of a granular catalyst carrier which was essentially γ-alumina. The individual alumina grains were about 3 mm in diameter, and the bulk density of the alumina grains was 820 g/liter.

First, 1 liter (820 g) of the granular alumina was kept immersed for 10 min in 400 ml of an aqueous solution prepared by dissolving 21.3 g of lanthanum nitrate La($NO_3$)$_2$.6H$_2$O and 15.6 g of aluminum nitrate Al($NO_3$)$_2$.6H$_2$O at room temperature. The granular alumina impregnated with the solution was dried in a hot air oven at 200° C. until the moisture content became below 10% by weight. The thus treated alumina grains were baked in a hydrogen gas stream at 950° C. for 1 hr to cause the nitrates adhering to the alumina grains to undergo decomposition to form a compound oxide of perovskite structure, namely, lanthanum aluminate $LaAlO_3$. By analysis it was confirmed that the content of La (existing as lanthanum aluminate) in the baked alumina grains was 1.0% by weight.

For the next step, a solution was prepared by dissolving 8.71 g of chloroplatinic acid $H_2PtCl_6.6H_2O$ in 2.8 liters of water purified by ion exhange, and the pH of the solution was adjusted to 1.9 by adding hydrochloric acid. The chloroplatinic acid solution was heated to 45° C., and ammonium thiosulfate $(NH_4)_2S_2O_3$ was added to the heated solution such that the mole ratio of platinum to sulfur in the solution became 1:2. The resultant solution was kept heated at about 45° C. for 5 min to cause reaction between the solutes. After that 1 liter of the alumina grains carrying lanthanum aluminate were impregnated with the sulfurized solution, and the wet grains were dried in an oven maintained at 200° C. until the moisture content became below 10% by weight. To accomplish uniform drying, the alumina grains under drying were kept flowing in the oven. The thus treated alumina grains were baked in a steam stream at 550° C. for 90 min to cause decomposition of the sulfurized platinum compound to metallic platinum.

The content of La in the catalyst prepared by the above described process was 1% by weight (of the granular carrier: in the same sense throughout the examples) and the content of Pt was 0.4% by weight.

EVALUATION TEST

The activity or conversion efficiency of every catalyst prepared in the herein described examples in the reforming of vaporized methanol into hydrogen and carbon monoxide and the endurance of the catalyst were evaluated by the following test.

In every case, a catalyst bed produced by using 20 ml of the catalyst for testing was initially maintained at 300° C., and vaporized methanol (industrial 100% methanol) was passed through the catalyst bed at a volume hourly space velocity of 2000 hr$^{-1}$. Soon the concentration of H$_2$ in the gas stream sampled at a section immediately downstream of the catalyst bed was measured by gas chromatography as an indication of the activity of the catalyst in fresh state. Then the temperature of the catalyst bed was raised to 400° C., and the vaporized methanol was continuously passed through the heated catalyst bed at the space velocity of 2000 hr$^{-1}$ for 200 hr. After that the temperature of the catalyst bed was lowered to 300° C., and the passing of vaporized methanol through the catalyst bed was continued to measure the concentration of H$_2$ in the gas again sampled at the aforementioned section. The endurance of the tested catalyst was evaluated by a comparison between the hydrogen concentration value obtained at the initial stage of the test and the concentration value obtained after the use of the catalyst bed at 400° C. for 200 hr.

The result of the evaluation test on the catalyst of Example 1 will be given hereinafter in table form together with the result of the same test on several different catalysts which are described below.

EXAMPLE 2

A catalyst according to the invention was prepared by the process described in Example 1 but in this case by using 21.0 g of cerium nitrate $Ce(NO_3)_2.6H_2O$ in place of lanthanum nitrate in Example 1. Therefore, this catalyst contained cerium aluminate $CeAlO_3$ and platinum. The content of Ce in this catalyst was 1% by weight, and the content of Pt was 0.4% by weight.

EXAMPLE 3

The process of Example 1 was identically repeated except that 31.3 g of titanium sulfate $Ti(SO_4)_2$ was used in place of lanthanum nitrate in Example 1 and that the quantity of aluminum nitrate was increased to 41.4 g. Therefore, this catalyst contained titanium aluminate $TiAlO_3$ and platinum. The content of Ti in this catalyst was 1% by weight, and the content of Pt was 0.4% by weight.

EXAMPLE 4

The process of Example 1 was identically repeated except that 25.5 g of zirconyl nitrate $ZrO(NO_3)_2 \cdot 2H_2O$ was used in place of lanthanum nitrate in Example 1 and that the quantity of aluminum nitrate was increased to 30.3 g. Therefore, this catalyst contained zirconium aluminate $ZrAlO_3$ and platinum. The content of Zr in this catalyst was 1% by weight, and the content of Pt was 0.4% by weight.

REFERENCE 1

By using 1 liter (820 g) of the granular γ-alumina carrier mentioned in Example 1, a catalyst was prepared by performing only the later half of the process of Example 1. That is, neither lanthanum nitrate (or any alternative thereto) nor aluminum nitrate was used in this case. This catalyst contained 0.4% by weight of Pt but did not contain any aluminate of a rare earth element or of a titanium family element.

REFERENCE 2

The process of Example 1 was repeated generally identically except that the use of aluminum nitrate in the initial impregnation step was omitted and that the baking of the alumina grains impregnated with the lanthanum nitrate solution was carried out in an air stream. This catalyst contained 1% by weight of La (existing as lanthanum oxide) and 0.4% by weight of Pt.

Table 1 shows the results of the above described evaluation test on the catalysts of Examples 1–4 and References 1 and 2.

TABLE 1

| Catalyst | Catalytic Substance | Concentration of $H_2$ in Sampled Gas (%) | |
|---|---|---|---|
| | | initially | after 200 hr |
| Example 1 | $LaAlO_3$ and Pt | 54 | 52 |
| Example 2 | $CeAlO_3$ and Pt | 56 | 55 |
| Example 3 | $TiAlO_3$ and Pt | 52 | 50 |
| Example 4 | $ZrAlO_3$ and Pt | 52 | 50 |
| Reference 1 | Pt | 39 | 31 |
| Reference 2 | $La_2O_3$ and Pt | 51 | 48 |

The test results shown in Table 1 demonstrate that catalysts according to the invention are superior to conventional catalysts both in the initial activity, i.e. activity in a fresh state, on the reforming of vaporized methanol into hydrogen and carbon monoxide and in the endurance or service life.

EXAMPLE 5

Five different catalysts, which will be referred to as Examples 5A, 5B, 5C, 5D and 5E, were prepared all generally in accordance with Example 2 but by varying the quantity of cerium nitrate to 1.055 g, 2.10 g, 315 g and 420 g, respectively, and the quantity of aluminum nitrate to 0.78 g, 1.56 g, 156 g, 234 g and 312 g, respectively. Therefore, every catalyst of Examples 5A–5E contained cerium aluminate together with platinum but was different from the catalyst of Example 2 in the content of cerium aluminate.

Invariably the content of Pt in the catalysts of Examples 5A–5E was 0.4% by weight, while the variation in the content of Ce in these catalysts was as shown in Table 2. These catalysts were subjected to the above described evaluation test the results of which are shown in Table 2.

TABLE 2

| Catalyst | Content of Ce (Wt %) | Concentration of $H_2$ in Sampled Gas (%) | |
|---|---|---|---|
| | | initially | after 200 hr |
| Reference 1 | 0 | 39 | 31 |
| Example 5A | 0.05 | 43 | 38 |
| Example 5B | 0.1 | 47 | 45 |
| Example 2 | 1.0 | 56 | 55 |
| Example 5C | 10.0 | 53 | 50 |
| Example 5D | 15.0 | 40 | 36 |
| Example 5E | 20.0 | 38 | 32 |

The data in Table 2 show the merit of using an aluminate of a rare earth metal jointly with platinum and demonstrate that both the initial activity and endurance of the catalyst are greatly improved when the content of the aluminate in the catalyst is such that the content of the rare earth metal in the catalyst is in the range from 0.1 to 10% by weight.

EXAMPLE 6

As Examples 6A, 6B, 6C and 6D, four different catalysts were prepared all generally in accordance with Example 2 but by varying the quantity of chloroplatinic acid to 1.09 g, 2.18 g, 4.36 g and 21.8 g, respectively, and the quantity of ammonium thiosulfate to 0.35 g, 0.69 g, 1.37 g and 6.85 g, respectively. Therefore, every catalyst of Examples 6A–6D contained an invariable amount of cerium aluminate together with a variable amount of platinum.

The content of Ce in the catalysts of Examples 6A–6D was 1% by weight, and the variation in the content of Pt was as shown in Table 3. The results of the evaluation test on these catalysts are shown in Table 3.

TABLE 3

| Catalyst | Content of Pt (Wt %) | Concentration of $H_2$ in Sampled Gas (%) | |
|---|---|---|---|
| | | initially | after 200 hr |
| Example 6A | 0.05 | 40 | 38 |
| Example 6B | 0.1 | 48 | 44 |
| Example 6C | 0.2 | 52 | 50 |
| Example 2 | 0.4 | 56 | 55 |
| Example 6D | 1.0 | 58 | 56 |

The data in Table 3 show the preferableness of the existence of at least 0.1% by weight of Pt in a catalyst according to the invention in terms of both the initial activity and endurance of the catalyst.

EXAMPLE 7

The process of Example 1 was identically repeated except that 10.65 g of lanthanum nitrate and 10.5 g of cerium nitrate were jointly used in place of 21.3 g of lanthanum nitrate in Example 1 and that the quantity of aluminum nitrate was varied to 15.5 g. Therefore, this catalyst contained cerium lanthanum aluminate and/or a mixture of cerium aluminate and lanthanum aluminate together with platinum. Numerically, this catalyst contained 0.5% by weight of La, 0.5% by weight of Ce and 0.4% by weight of Pt.

In the evaluation test on this catalyst, the concentration of $H_2$ in the sampled gas was 54% at the initial stage and 52% after the lapse of 200 hr.

EXAMPLE 8

The process of Example 2 was identically repeated except that 4.36 g of chloroplatinic acid and 3.3 g of palladium chloride PdCl₂ were jointly used in place of 8.71 g of chloroplatinic acid in Example 2. Therefore, this catalyst contained 0.2% by weight of Pt, 0.2% by weight of Pd and such an amount of cerium aluminate that the content of Ce in the catalyst was 1.0% by weight.

In the evaluation test on this catalyst, the concentration of H₂ in the sampled gas was 54% at the initial stage and 52% after the lapse of 200 hr.

EXAMPLE 9

The process of Example 2 was identically repeated except that 7.0 g of chloroplatinic acid and 0.16 g of rhodium chloride RhCl₃ were jointly used in place of 8.71 g of chloroplatinic acid in Example 2. Therefore, this catalyst contained 0.32% by weight of Pt, 0.08% by weight of Rh and such an amount of cerium nitrate that the content of Ce in the catalyst was 1.0% by weight.

In the evaluation test on this catalyst, the concentration of H₂ in the sampled gas was 56% at the initial stage and 55% after the lapse of 200 hr.

With reference to the data in Table 1, it will be understood that the catalysts of Examples 8 and 9 were comparable to the catalyst of Example 2 in both initial activity and endurance.

EXAMPLE 10

In repeating the process of Example 1, the step of adding ammonium thiosulfate to the chloroplatinic acid solution was omitted as the sole modification. The catalyst obtained in this example contained 1.0% by weight of La (existing as lanthanum aluminate) and 0.4% by weight of Pt similarly to the catalyst of Example 1.

In the evaluation test on the catalyst of Example 10, the concentration of H₂ in the sampled gas was 52% at the initial stage and 49% after the lapse of 200 hr. That is, the omission of the thiosulfate treatment at the stage of impregnating the granular carrier with the platinum compound solution resulted in only slight lowering in the initial activity and endurance of the catalyst.

EXAMPLE 11

In this example, the process of Example 1 was modified only in that the baking of the granular carrier impregnated with the chloroplatinic acid solution (treated with ammonium thiosulfate) was carried out in an air stream at 550° C. for 90 min. The catalyst of this example contained 1.0% by weight of La and 0.4% by weight of Pt similarly to the catalyst of Example 1.

In the evaluation test on the catalyst of Example 11, the concentration of H₂ in the sampled gas was 53% at the initial stage and 50% after the lapse of 200 hr. That is, the change of the gas atmosphere in the last baking step from steam to air resulted in only very slight lowering in the initial activity and endurance of the catalyst.

EXAMPLE 12

In this example the entire process of Example 1 was identically repeated with no modification, but the obtained catalyst was subjected to an additional treatment, which was a liquid phase reduction treatment performed in the following manner.

After the last baking step, the catalyst was left to cool down and then put into 2.0 liters of 0.1% (by weight) aqueous solution of sodium boron hydride and kept immersed in the solution for 3 min at room temperature. After this treatment the catalyst was washed and dried. The catalyst thus prepared in this example contained 0.4% by weight of Pt and such an amount of lanthanum aluminate that the content of La in the catalyst was 1% by weight.

The result of the evaluation test on the catalyst of Example 12 will be given hereinafter in table form together with the results of the same test on several different catalysts described below.

EXAMPLE 13

The process of Example 12, including the reduction treatment, was identically repeated except that 21.0 g of cerium nitrate was used in place of lanthanum nitrate in Example 12. Therefore, this catalyst contained cerium aluminate and platinum. The content of Ce in this catalyst was 1% by weight, and the content of Pt was 0.4% by weight.

EXAMPLE 14

The entire process of Example 12 was identically repeated except that 31.3 g of titanium sulfate was used in place of lanthanum nitrate in Example 12 and that the quantity of aluminum nitrate was increased to 41.4 g. Therefore, this catalyst contained titanium aluminate and platinum. The content of Ti in this catalyst was 1% by weight, and the content of Pt was 0.4% by weight.

EXAMPLE 15

The entire process of Example 12 was identically repeated except that 25.5 g of zirconyl nitrate was used in place of lanthanum nitrate in Example 12 and that the quantity of aluminum nitrate was increased to 30.3 g. Therefore, the obtained catalyst contained zirconium aluminate and platinum. The content of Zr in this catalyst was 1% by weight, and the content of Pt was 0.4% by weight.

REFERENCE 3

A catalyst was prepared by performing only a later part of the process of Example 12. In this case, the process was started by directly immersing the γ-alumina grains in the chloroplatinic acid solution without preceded by the impregnation and baking steps to form a compound oxide of perovskite structure. This catalyst contained 0.4% by weight of Pt but did not contain any rare earth metal nor any metal of the titanium family.

Table 4 shows the results of the evaluation test on the catalysts of Examples 12–15 and Reference 3.

TABLE 4

| Catalyst | Catalytic Substance | Concentration of H₂ in Sampled Gas (%) | |
|---|---|---|---|
| | | initially | after 200 hr |
| Example 12 | LaClO₃ and Pt | 60 | 58 |
| Example 13 | CeAlO₃ and Pt | 63 | 61 |
| Example 14 | TiAlO₃ and Pt | 59 | 56 |
| Example 15 | ZrAlO₃ and Pt | 59 | 55 |
| Reference 3 | Pt | 39 | 31 |

The test data in Table 4 demonstrate that catalysts according to the invention are superior to conventional catalysts and, when compared with the data in Table 1, that the treatment of catalysts according to the invention with a solution of a suitable reducing agent is highly effective for enhancement of the activity of the catalysts.

EXAMPLE 16

The process of Example 13 was identically repeated except that 1% (by weight) aqueous solution of hydrazine hydrate $N_2H_4 \cdot H_2O$ was used in place of the sodium boron hydride solution in Example 13. The catalyst of this example contained 1% by weight of Ce and 0.4% by weight of Pt similarly to the catalyst of Example 13.

EXAMPLE 17

In this example the process of Example 13 was modified only in that 2% (by weight) aqueous solution of formaldehyde HCHO was used in place of the sodium boron hydride solution. The catalyst of this example too contained 1% by weight of Ce and 0.4% by weight of Pt similarly to the catalyst of Example 13.

Table 5 shows the results of the evaluation test on the catalysts of Examples 16 and 17 and, for comparison, contains the corresponding data of Examples 2 and 13 extracted from the preceding tables.

TABLE 5

| Catalyst | Reducing Agent | Concentration of $H_2$ in Sampled Gas (%) | |
|---|---|---|---|
| | | initially | after 200 hr |
| Example 2 | not used | 56 | 55 |
| Example 13 | sodium boron hydride | 63 | 61 |
| Example 16 | hydrazine | 60 | 58 |
| Example 17 | formaldehyde | 58 | 55 |

The data in Table 5 again demonstrate the merit of performing the reduction treatment and imply the advantage of sodium boron hydride as the reducing agent.

What is claimed is:

1. A catalyst for reforming methanol to hydrogen and carbon monoxide, consisting essentially of:

a carrier which comprises active alumina over at least substantially the entire surface thereof; applied to said carrier, at least one compound oxide which is expressed by the general formula $MAlO_3$ which is a perovskite structure, wherein M represents a metal element selected from the group consisting of the titanium family elements; and at least one catalytic metal of the platinum group, deposited in reduced metallic form on said carrier.

2. A catalyst according to claim 1, wherein the total amount of the metal M in said at least one oxide is in the range from 0.1 to 10.0% by weight of the carrier and the total amount of said at least one catalytic metal in the catalyst being in the range from 0.1 to 1.0% by weight.

3. A catalyst according to claim 2, wherein the metal M in said at least one compound oxide is selected from the group consisting of Ti and Zr.

4. A catalyst according to claim 3, wherein said at least one catalytically metal is selected from the group consisting of Pt, Pd and Rh.

5. A catalyst according to claim 4, wherein said at least one oxide is formed by impregnating said carrier with an aqueous mixed solution of an inorganic salt of aluminum and at least one inorganic salt of metal M and baking the impregnated carrier, and said at least one catalytic metal is deposited by impregnating the carrier having said at least one oxide thereon with an aqueous solution of at least one inorganic compound of the catalytic metal and baking the carrier impregnated with the catalytic metal compound solution.

6. A catalyst according to claim 5, wherein the carrier after the baking step for the deposition of said at least one catalytic metal is treated with a solution of a reducing agent.

7. A catalyst according to claim 1, wherein said carrier is granular.

8. A catalyst according to claim 1, wherein said carrier is monolithic.

9. A process for preparing a catalyst for reforming of methanol to hydrogen and carbon monoxide, the process comprising the steps of:

(a) impregnating a carrier, which comprises active alumina over at least substantially the entire surface thereof, with an aqueous mixed solution of an inorganic salt of aluminum and at least one inorganic salt of a metal selected from the group consisting of the titanium family elements;

(b) baking the impregnated carrier to form on the carrier from the salts contained in said solution at least one compound oxide of a perovskite crystalline structure which is expressed by the general formula $MAlO_3$, wherein M represents said metal;

(c) impregnating the carrier baked at step (b) with an aqueous solution of at least one thermally decomposable inorganic compound of a catalytic metal of the platinum group;

(d) baking the carrier impregnated with the catalytic metal compound solution to decompose said inorganic compound, thereby depositing in reduced metallic form at least one catalytic metal of the platinum group on said carrier.

10. A process according to claim 9, wherein the total amount of the metal M in said at least one compound oxide is in the range from 0.1 to 10.0% by weight of said carrier, and the total content of said at least one catalytic metal in the catalyst is in the range from 0.1 to 1.0% by weight.

11. A process according to claim 10, wherein the metal M of each compound oxide $MAlO_3$ is selected from the group consisting of Ti and Zr.

12. A process according to claim 11, wherein the inorganic salt of each metal M is selected from the group consisting of nitrate, oxynitrate and sulfate.

13. A process according to claim 11, wherein said catalytic metal of the platinum group is selected from the group consisting of Pt, Pd and Rh.

14. A process according to claim 13, wherein said inorganic compound of a catalytic metal is selected from the group consisting of chloroplatinic acid, palladium dichloride and rhodium trichloride.

15. A process according to claim 13, wherein said solution at step (c) further comprises ammonium thiosulfate.

16. A process according to claim 9, wherein the baking at step (b) is performed in a hydrogen gas atmosphere at temperatures in the range from about 800° C. to about 950° C.

17. A process according to claim 16, wherein the duration of baking at the step (b) is from about 1 hr to about 3 hr.

18. A process according to claim 16, wherein the baking at step (d) is performed in a steam atmosphere at temperatures in the range from about 500° C. to about 600° C.

19. A process according to claim 16, wherein the baking at step (d) is performed in air at temperatures in the range from about 500° C. to about 600° C.

20. A process according to claim 16, wherein the baking at step (d) is performed in a hydrogen gas atmosphere at temperatures in the range from about 500° C. to about 600° C.

21. A process according to claim 9, further comprising the step after step (d), of immersing the catalyst in a solution of a reducing agent.

22. A process according to claim 21, wherein said reducing agent is selected from the group consisting of sodium boron hydride, sodium sulfide, ammonium sulfide, hydrazine, formaldehyde, pyrogallol, hydroquinone, formic acid and oxalic acid.

23. A process according to claim 22, wherein the concentration of said reducing agent in the solution is in the range from 0.05 to 2% by weight.

24. A process according to claim 23, wherein the duration of said reduction treatment is from about 1 min to about 5 min.

25. A process according to claim 9, wherein said carrier is granular.

26. A process according to claim 9, wherein said carrier is monolithic.

27. A catalyst for the reforming of methanol to hydrogen and carbon monoxide, produced by the method according to claim 9.

28. A process of preparing a catalyst for reforming of methanol to hydrogen and carbon monoxide, the process comprising the steps of:
(a) impregnating a carrier, which comprises active alumina over at least substantially the entire surface thereof, with an aqueous mixed solution of an inorganic salt of aluminum and at least one inorganic salt of a metal selected from the group consisting of the rare earth elements and the titanium family elements;
(b) baking the impregnated carrier in a hydrogen gas atmosphere at a temperature in the range from about 800° C. to about 950° C., to form on the carrier from the salts contained in said solution at least one compound oxide of a perovskite crystalline structure which is expressed by the general formula $MAlO_3$, wherein M is selected from La, Ce, Ti, and Zr, such that the total amount of metal M in the compound oxide becomes 0.1 to 1.0% by weight of the carrier;
(c) impregnating the carrier baked at step (b) with an aqueous solution comprising ammonium thiosulfate and at least one thermally decomposable compound selected from the group consisting of chloroplatinic acid, palladium dichloride and rhodium trichloride such that the total content of the catalytic metal is from about 0.1 to 1.0% by weight;
(d) baking the carrier impregnated with the catalytic metal compound solution in a steam atmosphere at temperatures in the range from about 500° C. to about 600° C. to decompose said inorganic compound, thereby depositing in reduced metallic form at least one catalytic metal of the platinum group on said carrier; and
(e) after step (d), immersing the formed catalyst in a solution of a reducing agent comprising sodium boron hydride.

* * * * *